March 6, 1928.
C. J. PARR
1,661,444
AUTOMOBILE JACK
Filed Oct. 8, 1926
2 Sheets-Sheet 2
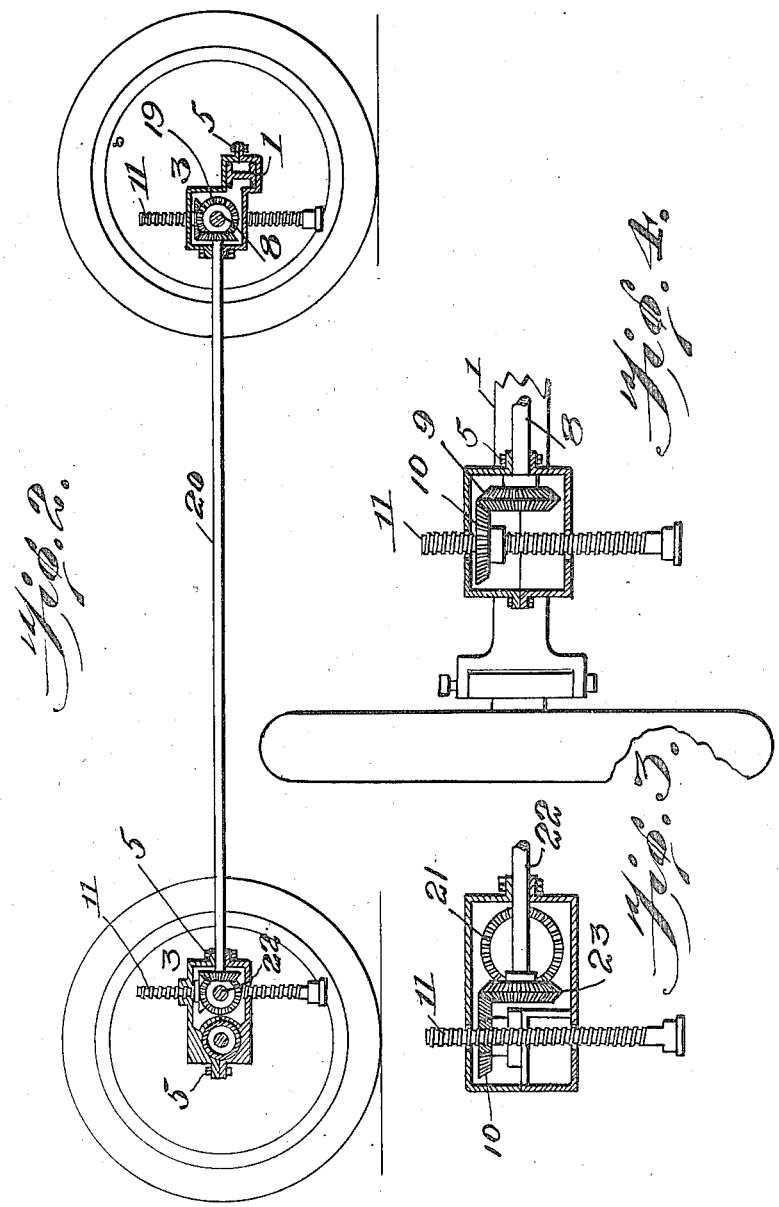
INVENTOR.
Clarence J. Parr.
BY
ATTORNEYS.

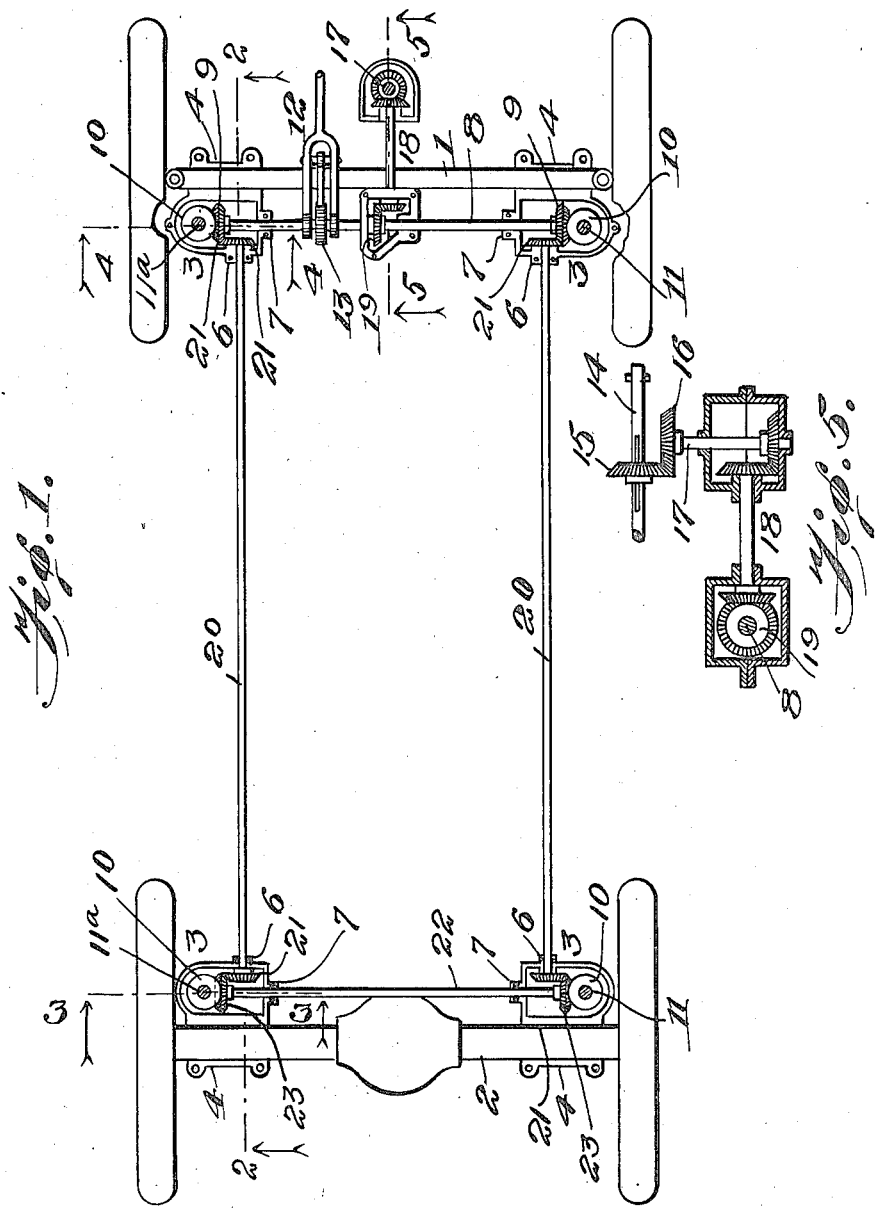

Patented Mar. 6, 1928.

1,661,444

UNITED STATES PATENT OFFICE.

CLARENCE J. PARR, OF HANNIBAL, MISSOURI.

AUTOMOBILE JACK.

Application filed October 8, 1926. Serial No. 140,266.

This invention relates to automobile jacks.

The object of the invention is the construction of a simple and efficient jack, which will raise the wheels of a motor vehicle entirely off a floor or a roadway, and thereby remove the weight of the load from off the tires.

Another object of the invention is the construction of a jack apparatus, including a transverse primary driving shaft, two parallel longitudinally extending driving shafts and a single rear driven shaft, the primary driving shaft and the rear driven shaft being connected at their ends with four vertically moving jacks, whereby the motor vehicle to which my apparatus is attached can be lifted off a floor or a roadway and kept in this "suspended" position, at the will of the operator.

With the foregoing and other objects in view, my invention comprises certain novel constructions, combinations, and arrangements of parts as will be hereinafter fully described, illustrated in the accompanying drawings, and more particularly pointed out in the appended claims.

In the drawings:

Figure 1 is a top plan view of an apparatus constructed in accordance with the present invention, showing the top section of each gear casing removed.

Figure 2 is a sectional view taken on line 2—2 Figure 1, and looking in the direction of the arrows.

Figure 3 is a sectional view taken on line 3—3, Figure 1, and looking in the direction of the arrows.

Figure 4 is a sectional view taken on line 4—4, Figure 1, and looking in the direction of the arrows.

Figure 5 is a sectional view taken on line 5—5, Figure 1, and looking in the direction of the arrows.

Referring to the drawings by numerals, 1 designates the front axle of a motor vehicle, and 2 is its rear axle. To each of these axles are attached sectional gear casings 3. Each gear casing 3 is provided with a portion 4, surrounding the axle, and by means of ordinary bolts 5, the sections of the casing are held together upon the axle. Each casing 3 is provided with a side horizontal bearing 6 and and inner-end horizontal bearing 7, in which bearings are journalled the shafts, as hereinafter described.

The primary driving shaft 8 is journalled in bearings 7 of the two gear casings 3 attached to front axle 1. On the ends of shaft 8 are bevelled gears 9. These gears 9 mesh with bevelled gears 10. Gears 10 are rotatably mounted on the threaded vertically-movable jacks 11 and 11ª. There are four of these jacks in my apparatus comprising two right hand and two left hand threaded jacks, and they travel through the gear casings 3, sufficiently for the lifting of a motor vehicle off the floor or a roadway, or after it has been lifted, to allow the motor vehicle to again rest upon the particular floor or roadway over which it may have been suspended.

A manually controlled ratchet and lever device 12 (Fig. 1) may be employed, in conjunction with the toothed wheel 13, to impart rotary movement to the shaft 8 for raising and lowering the jacks 11 and 11ª. However, the motor shaft 14 (Fig. 5) may have a sliding gear 15 thereon, which can be made to mesh, in any ordinary way with bevelled gear 16, carried on shaft 17, and this shaft 17 is geared up at 18 with the gear 19 secured to the driving shaft 8. Therefore, it will be seen that at 12 (Fig. 1) I have manual means for operating my jack apparatus, while in Figure 5, I have more clearly shown motor actuating means, for operating the apparatus.

A pair of parallel, horizontal longitudinally-extending auxiliary driving shafts 20 are used to equalize the strain on the two rear jacks, and these shafts have their ends journalled in the horizontal side bearing 6 of the four axle-carried casings 3. The ends of shafts 20 extend into casings 3, and on the same are secured bevelled gears 21. The gears 21 within the casings 3 supported on front axle 1 mesh with the double bevelled gears 9, whereby when shaft 8 is rotated, driving shaft 20 will likewise be rotated, imparting rotary movement also to bevelled gears in the gear casings 3 that are attached to the rear axle 2. A driven shaft 22 is journalled in the end bearings 7 of the rear casings 3. On the ends of shaft 22, within rear casings 3 are double bevelled gears 23. These gears 23 mesh with gears 21 and also with the horizontal gears 10 that are rotatably mounted upon the threaded jacks 11 and 11ª. Therefore, when shafts 20 are rotated, through the medium of the shaft 22, perfect rotation of gears 10, and jacks 11, is caused.

It will be understood from the foregoing description that when the operator manually rotates primary driving shaft 8, or when the motor of the automobile or motor vehicle is employed to rotate said shaft 8, synchronous movement will be imparted to all of the jacks 11 and 11ª, to raise or lower the jacks as the case may be. The jacks are normally in a raised position as clearly shown in Figure 2, but upon the driving shaft 8 being rotated in one direction, the jacks 11 and 11ª will be threaded downwardly, against the floor or ground or roadway, sufficiently to raise the the entire automobile or motor vehicle off the floor, either for repairing the tires, or more readily having access to the running gear or for removing the weight of the load off the tires as when the automobile or motor vehicle is in a garage, or is stored away for a definite length of time.

The peculiar arrangement of the four shafts in my jack apparatus, together with the way they are supported in the horizontal bearings of the four axle-carried casings, result in a very efficient and durable mechanism, which produces a very satisfactory automobile jack, not heretofore disclosed in the prior art.

While I have described the preferred embodiment of my invention and illustrated the the same in the accompanying drawings, certain minor changes or alterations may appear to one skilled in the art to which this invention relates during the extensive manufacture of the same, and I, therefore, reserve the right to make such changes or alterations as shall fairly fall within the scope of the present invention.

What I claim is:

1. In an apparatus of the class described, the combination with a front and a rear axle, a set of casings on each axle, vertically movable jacks mounted upon said casings, of a primary driving shaft connected at its ends to the jacks in the set of casings on the front axle, a driven shaft connected at its ends to the jacks in the set of casings on the rear axle, a pair of longitudinally-extending auxiliary driving shafts extending at their ends into the sets of casings on the front and rear axles, and means within said casings connecting all of said shafts and gears, whereby when said primary driven shaft is operated, said jacks will be operated upon said casings.

2. In an apparatus of the class described, the combination with a front and a rear axle, of a pair of casings carried by each of said axles, all of said casings provided with outwardly extending side bearings and inwardly extending end bearings, all of said bearings in a horizontal plane, vertically movable jacks supported upon said casings, a primary driving shaft journalled upon the end bearings of the set of casings carried by the front axle, means connecting said driving shaft to the jacks of the set of casings carried by the front axle, whereby when the driving shaft is operated, said jacks will be operated, a driven shaft journalled upon the end bearings of the set of casings carried by said rear axle, means connecting said driven shaft to the jacks of the set of casings carried by said rear axle, a pair of longitudinally extending horizontal auxiliary driving shafts having their front ends rotatably connected to said primary driving shaft and their rear ends rotatably connected to said driven shaft, and means connected to said driving shaft whereby power can be imparted thereto for rotating the same and operating the jacks.

In testimony whereof I hereunto affix my signature.

CLARENCE J. PARR.